(12) United States Patent
Marupaduga

(10) Patent No.: US 11,218,889 B1
(45) Date of Patent: Jan. 4, 2022

(54) WIRELESS ACCESS NODE USAGE BASED ON SECTOR POWER RATIO

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 51 days.

(21) Appl. No.: 16/879,461

(22) Filed: May 20, 2020

(51) Int. Cl.
*H04W 24/02* (2009.01)

(52) U.S. Cl.
CPC .................................. *H04W 24/02* (2013.01)

(58) Field of Classification Search
CPC ...................................................... H04W 24/02
See application file for complete search history.

(56) References Cited

U.S. PATENT DOCUMENTS

| | | | |
|---|---|---|---|
| 8,358,982 B2 | 1/2013 | Van Der Velde et al. | |
| 8,634,836 B2 | 1/2014 | Pani et al. | |
| 8,873,413 B2 | 10/2014 | Jang et al. | |
| 8,897,783 B2 | 11/2014 | Olofsson et al. | |
| 9,088,912 B2 | 7/2015 | Ou | |
| 9,313,694 B2 | 4/2016 | Lee et al. | |
| 9,344,945 B2 | 5/2016 | Da Silva et al. | |
| 9,408,121 B2 | 8/2016 | Xiao et al. | |
| 9,497,685 B2 | 11/2016 | Lee et al. | |
| 9,894,569 B2 | 2/2018 | Lee et al. | |
| 10,194,361 B2 | 1/2019 | Sirotkin et al. | |
| 10,485,000 B2 | 11/2019 | Shaheen et al. | |
| 2015/0181596 A1* | 6/2015 | Sridharan | H04W 72/085 455/450 |
| 2015/0289280 A1* | 10/2015 | Davydov | H04L 5/0092 370/252 |

* cited by examiner

*Primary Examiner* — Kyaw Z Soe

(57) ABSTRACT

A wireless communication network serves a wireless User Equipment (UE) and comprises a wireless access node and a support access node. The wireless access node determines a sector power ratio for the support access node. The wireless access node determines an add threshold for the support access node based on the sector power ratio for the support access node. The wireless access node determines an add value for the support access node and determines when the add value is greater than the add threshold. When the add value is greater than the add threshold, the wireless access node signals the support access node to serve the wireless UE and signals the wireless UE to attach to the support access node. In response, the support access node wirelessly transfers user data for a wireless communication service to the wireless UE.

20 Claims, 11 Drawing Sheets

WIRELESS ACCESS NODE USAGE BASED ON SECTOR POWER RATIO

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

A wireless access node that provides dual connectivity simultaneously serves a single user device over parallel LTE and 5GNR wireless links. An Evolved Universal Terrestrial Radio Access Network Dual Connectivity (EN-DC) node comprises both an LTE eNodeB and one or more 5GNR gNodeBs. An EN-DC user device initially attaches to the LTE eNodeB in the EN-DC node. The EN-DC user device reports 5GNR signal quality for the 5GNR gNodeBs to the LTE eNodeB. The LTE eNodeB determines if any of the 5GNR gNodeBs should be used to serve the EN-DC user device based on the signal quality. To determine if a 5GNR gNodeB should be used, the LTE eNodeB compares the received signal quality for the 5GNR gNodeB at the EN-DC user device to a threshold that is referred to as "B1". The LTE eNodeB may also consider frequency offsets and hysteresis along with signal quality.

Wireless access nodes exchange wireless signals with wireless user devices in geographic areas called sectors. Some power from the wireless signals transmitted to the wireless user devices inside of a sector propagates outside of the sector. Unfortunately, this external power interferes with wireless communications in the neighboring sectors, especially when the source sector is heavily loaded. A sector power ratio comprises an amount of power propagating outside of a sector to the amount of power propagating inside of the sector. If the sector power ratio is large for a sector, then that sector emits a correspondingly large amount of interference into its neighboring sectors. A sector power ratio characterizes the amount of interference that propagates outside of a specific sector, and the sector power ratio varies from sector to sector based on differences in environment, electronics, software, and the like.

Unfortunately, the wireless access nodes do not effectively and efficiently mitigate the interference that propagates from their sectors into neighboring sectors. Moreover, the EN-DC access nodes do not effectively and efficiently mitigate the interference that propagates from 5GNR sectors into neighboring sectors.

TECHNICAL OVERVIEW

A wireless communication network serves a wireless User Equipment (UE) with a wireless communication service over multiple wireless communication links. The wireless communication network comprises a wireless access node and a support access node. The wireless access node wirelessly receives a signal metric for the support access node from the wireless UE. The wireless access node determines a sector power ratio for the support access node. The wireless access node determines an add threshold for the support access node based on the sector power ratio for the support access node. The wireless access node converts the signal metric into an add value for the support access node and determines when the add value is greater than the add threshold. When the add value is greater than the add threshold, the wireless access node signals the support access node to serve the wireless UE and signals the wireless UE to attach to the support access node. The support access node wirelessly transfers user data for the wireless network service to the wireless UE responsive to the signal from the wireless access node.

DETAILED DESCRIPTION

Figure 1:
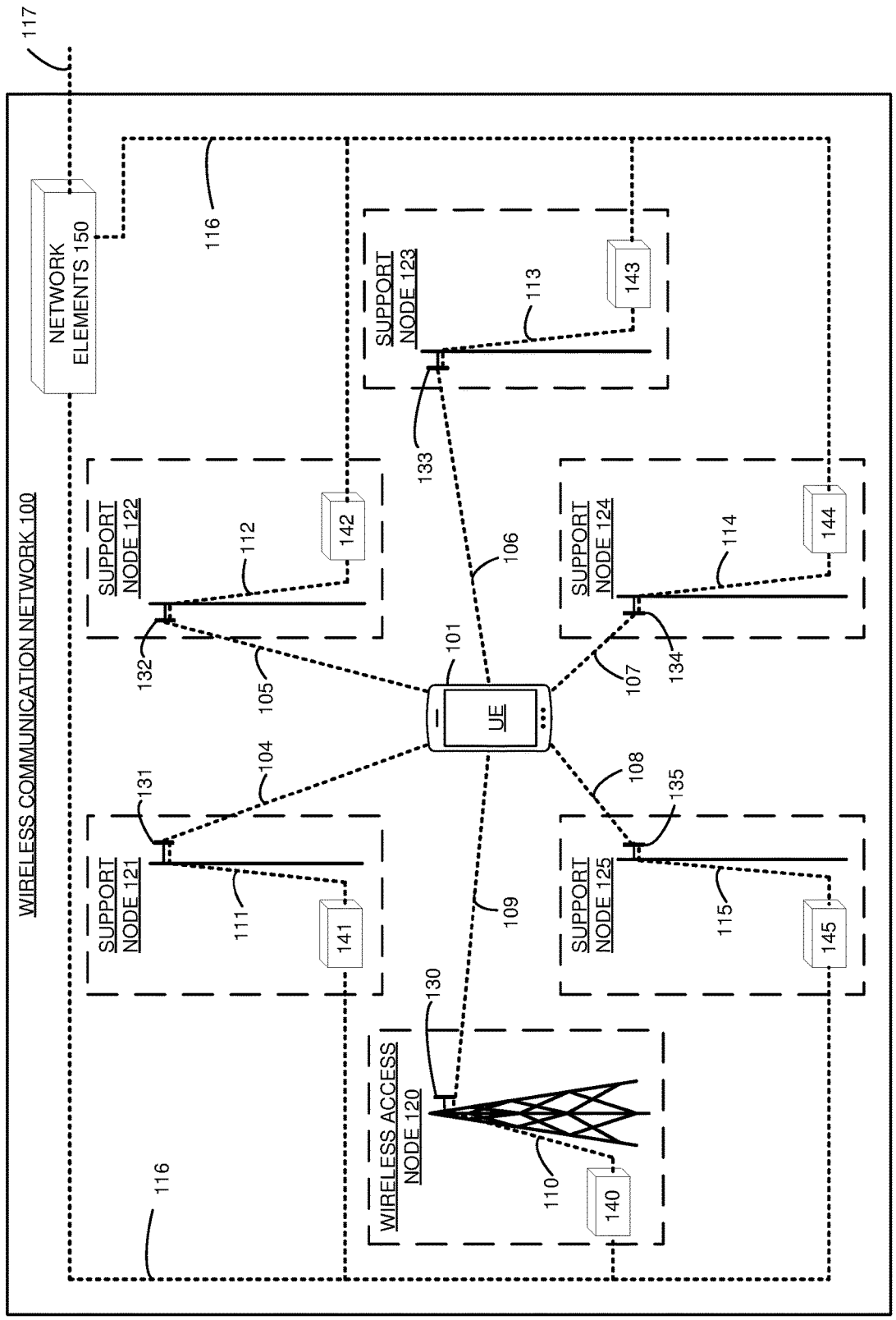
FIG. 1 illustrates a wireless communications network to serve a wireless User Equipment with a wireless communication service over multiple wireless links based on sector power ratio.

FIG. 1 illustrates wireless communication network 100 to serve wireless User Equipment (UE) 101 with a wireless communication service over multiple wireless links based on sector power ratio. Wireless communication network 100 comprises wireless UE 101, wireless access node 120, support access nodes 121-125, and network elements 150. Although UE 101 is depicted as a smartphone, UE 101 might instead comprise a computer, robot, vehicle, or some other data appliance with wireless communication circuitry. Wireless access node 120 comprises radio 130 and Baseband Unit (BBU) 140. Support access nodes 121-125 comprise radios 131-135 and BBUs 141-145. Radios 130-135 are mounted on a tower, but radios 130-135 may use other mounting structures or no mounting structure at all.

Various examples of network operation and configuration are described herein. In one example, UE 101 wirelessly attaches to radio 130. Radio 130 wirelessly exchanges user data with UE 101 over wireless links 109. Radio 130 exchanges the user data with BBU 140 over BBU links 110. BBU 140 exchanges the user data with network elements 150 over backhaul links 116. Network elements 150 exchange the user data with external systems over external links 117. UE 101 measures one or more signal metrics for support access nodes 121-125. Exemplary signal metrics comprise Received Signal Code Power (RSCP), Energy per Chip over Noise Spectral Density (Ec/No), Receiver Level (RxLev), or some other radio measurement. Radio 130 exchanges the signal metrics with BBU 140 over BBU links 110. BBU 140 determines individual sector power ratios for support access nodes 121-125—typically by retrieving sector power ratio values for support access nodes 121-125 from a BBU memory.

BBU 130 determines an add threshold for each of access nodes 120-125 based on the sector power ratios for each of radios 130-135. BBU 140 selects a relatively high add threshold for an access node when its sector power ratio is relatively high. BBU 140 selects a relatively low add threshold for an access node when its sector power ratio is relatively low. BBU 140 converts the signal metrics for support access nodes 121-125 into add values for support access nodes 121-125. When the add value is greater than the add threshold for any of support access nodes 121-125, BBU 140 directs UE 101 to wirelessly attach to the corresponding ones of support access nodes 121-125. BBU 140 directs the corresponding ones of support access nodes 121-125 to wirelessly exchange user data with UE 101.

Wireless links 104-109 use over-the-air air electromagnetic frequencies in the low-band, mid-band, high-band, or some other portion of the electromagnetic spectrum. Wireless links 104-109 use protocols like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other format wireless protocol. Links 110-117 use metal, glass, air, or some other media. Links 110-117 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 104-117 may comprise intermediate network elements like relays, routers, and controllers.

UE 101 and radios 130-135 comprise antennas, amplifiers, filters, modulation, analog/digital interfaces, microprocessors, software, memories, transceivers, bus circuitry, and the like. BBUs 140-145 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Wireless nodes 120-125 comprise 5GNR gNodeBs, LTE eNodeBs, WIFI hotspots, LP-WAN hubs, Evolved Universal Terrestrial Radio Access Network Dual Connectivity (EN-DC) nodes, and/or some other wireless network apparatus. Network elements 150 comprise User Plane Functions (UPFs), Access and Mobility Management Function (AMFs), Serving Gateways (SGWs), Mobility Management Entities (MMEs), and/or some other network apparatus.

In some examples, UE 110 selects report thresholds based on sector power ratios as described herein for the selection of the add thresholds. UE 110 measures signal metrics for support nodes 121-125 and compares the signal metrics to the report thresholds. When the signal metrics for one or more support nodes 121-125 exceed their report thresholds, UE 110 transfers a measurement report to wireless access node 120 indicating the signal metrics for support nodes 121-125.

Figure 2:
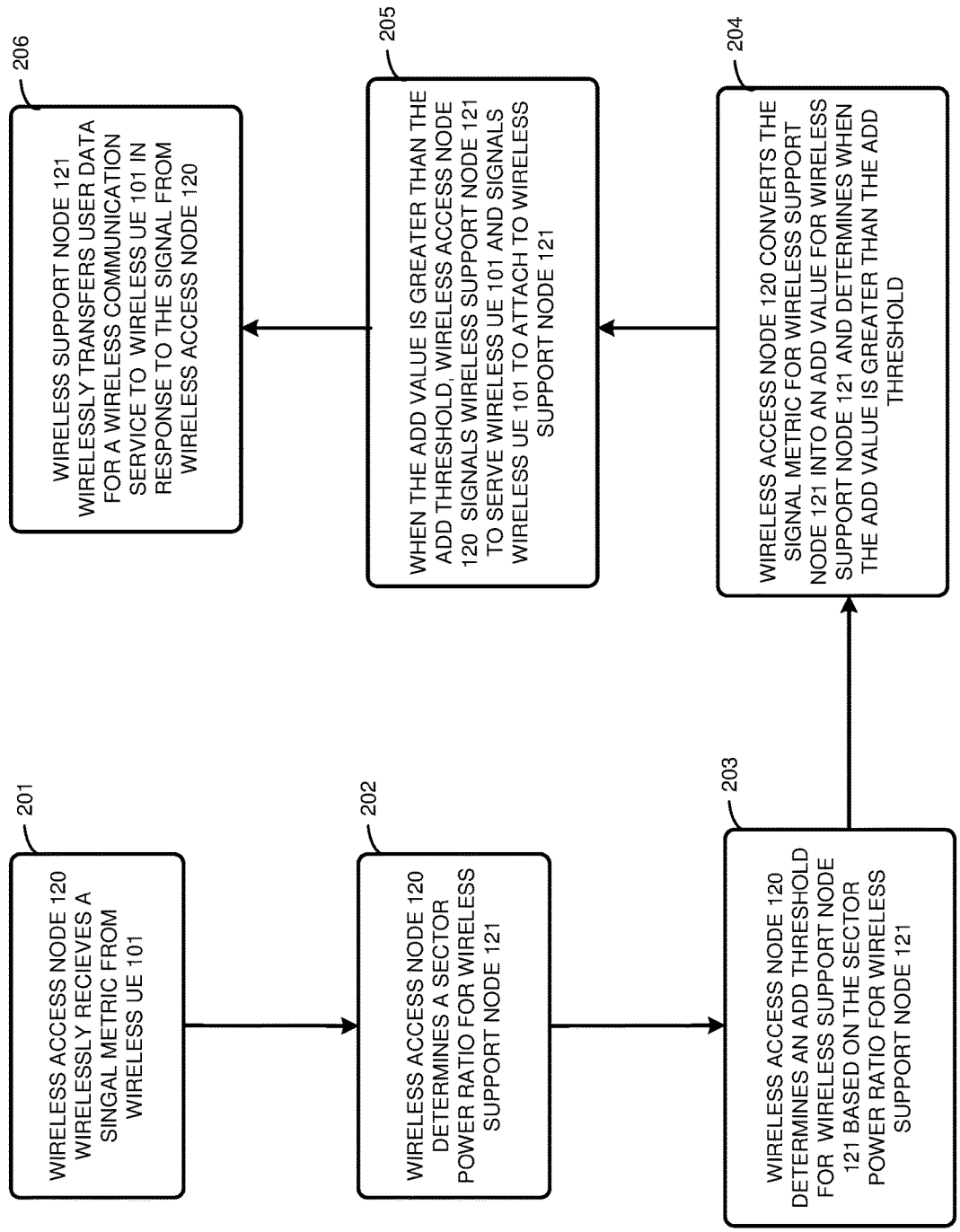
FIG. 2 illustrates an exemplary operation of the wireless communication network to serve the wireless UE over multiple wireless links based on sector power ratio.

FIG. 2 illustrates an exemplary operation of wireless communication network 100 to serve wireless UE 101 with a wireless communication service over multiple wireless links based on sector power ratio. Wireless access node 120 wirelessly receives a signal metric from UE 101 (201). Wireless access node 120 determines a sector power ratio for support access node 121 (202). Wireless access node 120 determines an add threshold for support access node 121 based on the sector power ratio for support access node 121 (203). For example, wireless access node 120 may select a relatively high add threshold when the sector power ratio for support access node 121 is relatively high. Conversely, wireless access node 120 may select a relatively low add threshold when the sector power ratio for the support access node 121 is relatively low.

Wireless access node 120 converts the signal metric for support access node 121 into an add value for support access node 121 and determines when the add value is greater than the add threshold (204). When the add value is greater than the add threshold, wireless access node 120 signals support access node 121 to serve wireless UE 101 and signals wireless UE 101 to wirelessly attach to support access node 121 (205). Support access node 121 wirelessly transfers user data for the wireless communication service to wireless UE 101 in response to the signal from wireless access node 120 (206).

Figure 3:
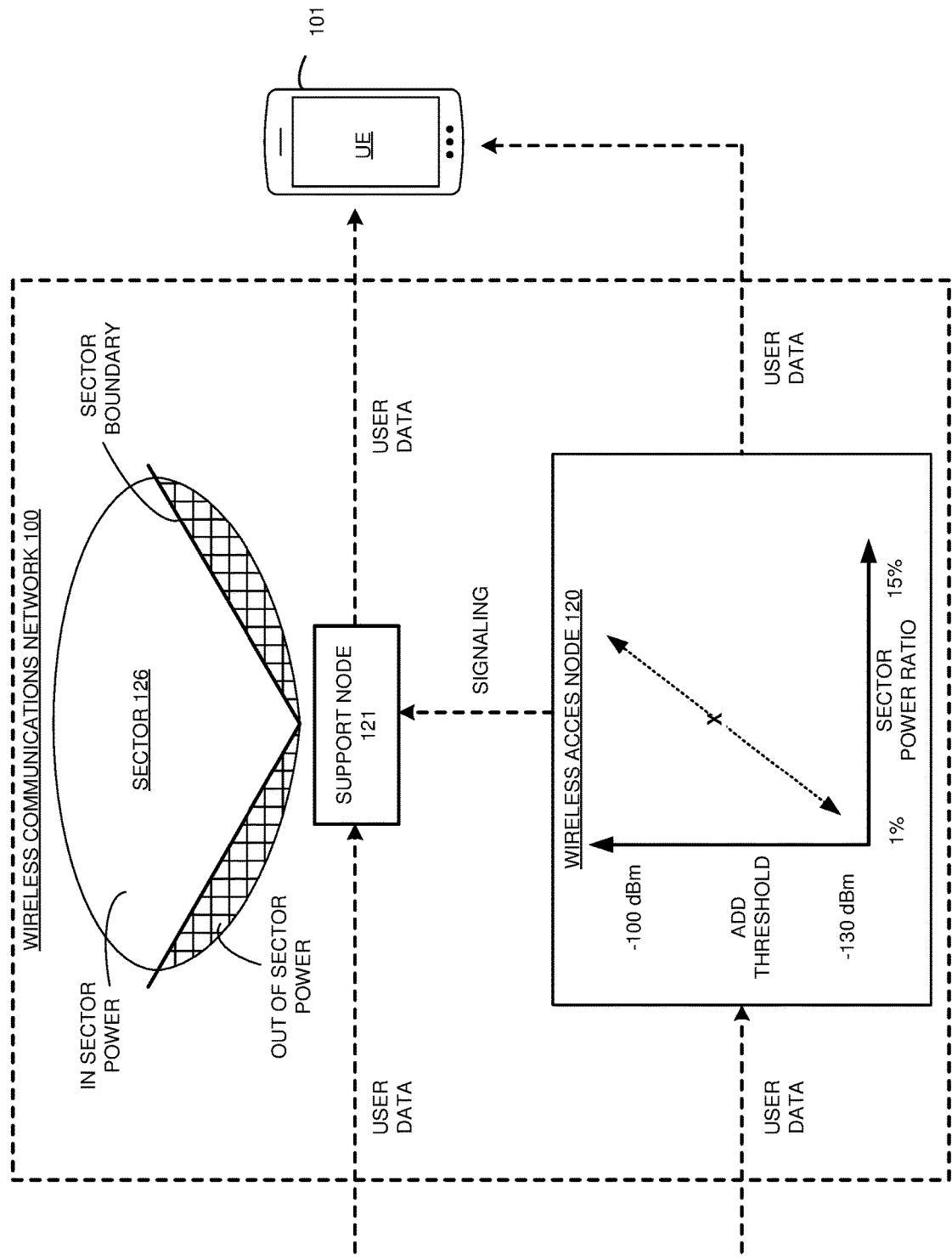
FIG. 3 illustrates an exemplary operation of a wireless access node to serve a wireless UE over multiple wireless links based on sector power ratio.

FIG. 3 illustrates an exemplary operation of wireless communication network 100 to serve wireless UE 101 a wireless communication service over multiple wireless links based on sector power ratio. Support access node 121 is depicted serving sector 126. Support access node 121 emits Radio Frequency (RF) power, and the portion of the emitted RF power that remains in sector 126 is labeled in-sector power. The portion of the emitted RF power that propagates outside of sector 126 and is labeled out-of-sector power. The sector power ratio for support access node 121 and sector 126 is an amount of out-of-sector power divided by an amount of in-sector power. Support access node 121 may send the sector power information to wireless access node 120 or wireless access node 120 may store the sector power information.

Wireless access node 120 hosts a data structure that implements the graph shown on FIG. 3. The vertical axis of the graph indicates an add threshold in an exemplary range: −130 dBm to −100 dBm. The horizontal axis indicates a sector power ratio in an exemplary range: 1% to 15%. These numbers are illustrative and other values could be used. As indicated by the X mark on the graph, a sector power ratio of around 7% correlates to an add threshold of around −112 Decibel Milliwatts (dBm). Wireless access node 120 determines the add threshold for support access node 121 based on the sector power ratio and the data structure.

UE 101 attaches to wireless access node 120. UE 101 wirelessly transfers signal metrics for support access node 121 to wireless access node 120. The signal metrics indicate a signal strength and/or signal quality. For example, the signal metrics may include RSCP, Ec/No, RxLev, or some other radio measurement. Wireless access node 120 receives the signal metrics from UE 101. Wireless access node 120 converts the signal metrics for support access node 121 into an add value for support access node 121. When the add value is less than the add threshold, wireless access node 120 does not add support access node 121. When the add value is greater than the add threshold, wireless access node 120 directs support access node to serve UE 101 with a wireless communications service and signals UE 101 to attach to support access node 121. Support access node 121 wirelessly transfers user data for the wireless communications service to UE 101.

Advantageously, wireless access node 120 controls the add threshold to push UEs to good sectors with good power ratios and to pull UEs away from bad sectors with poor power ratios to mitigate interference propagation into neighboring sectors.

Figure 4:
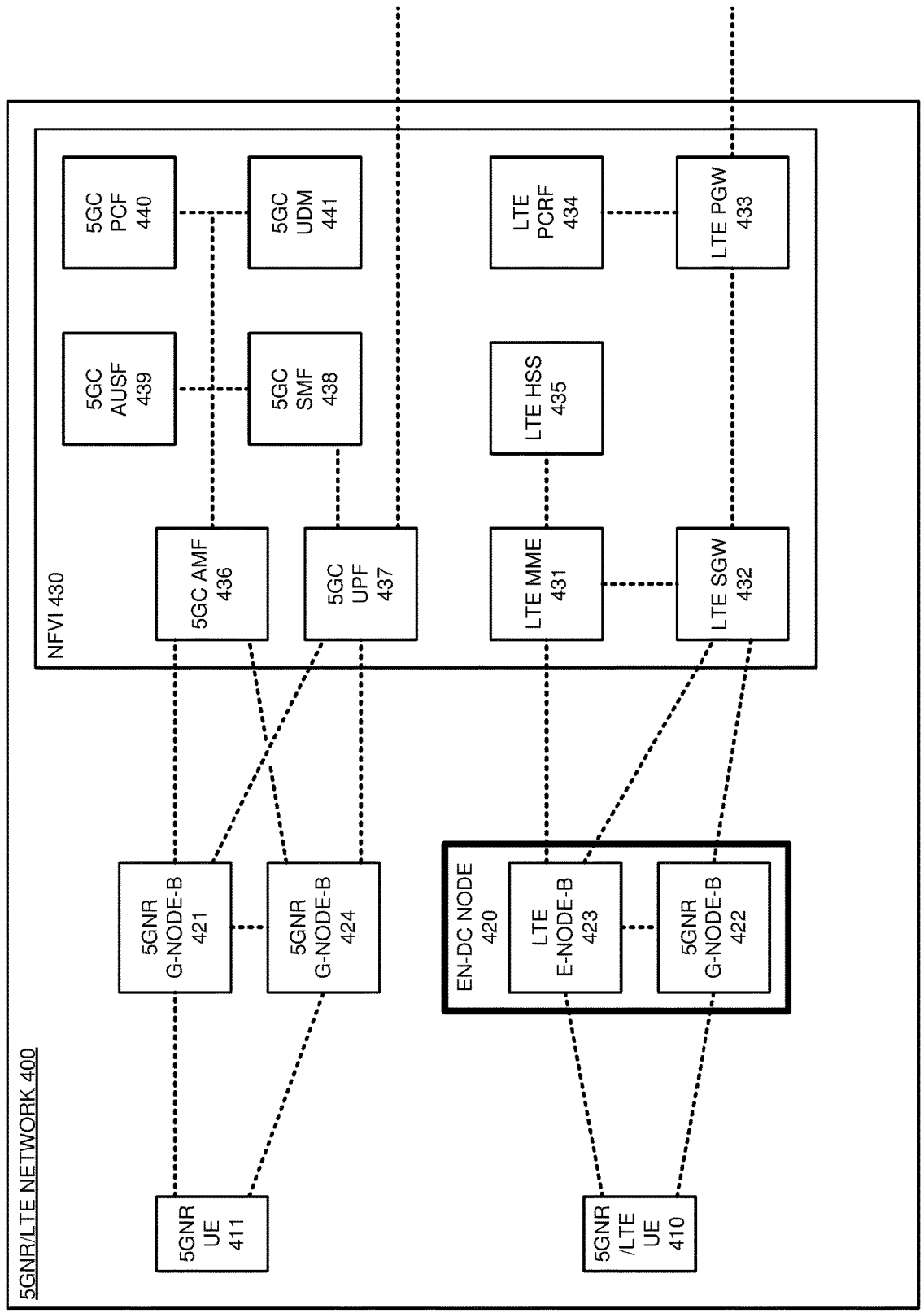
FIG. 4 illustrates a Fifth Generation New Radio (5GNR) Long Term Evolution (LTE) network to serve UEs over 5GNR gNodeBs based on sector power ratio.

FIG. 4 illustrates Fifth Generation New Radio (5GNR) Long Term Evolution (LTE) network 400 to serve UEs 410-411 over 5GNR gNodeBs based sector power ratio. 5GNR/LTE network 400 is an example of wireless communication network 100, although network 100 may differ. 5GNR/LTE network 400 comprises 5GNR/LTE UE 410, 5GNR UE 411, EN-DC node 420, 5GNR gNodeB 421, 5GNR gNodeB 424, and Network Function Virtualization Infrastructure (NFVI) 430. EN-DC node 420 comprises 5GNR gNodeB 422 and LTE eNodeB 423. NFVI 430 comprises LTE Mobility Management Entity (MME) 431, LTE Serving Gateway (SGW) 432, LTE Packet Data Network Gateway (PGW) 433, LTE Policy Charging Rules Function (PCRF) 434, LTE Home Subscriber System (HSS) 435, Fifth Generation Core (5GC) Access and Mobility Management Function (AMF) 436, 5GC User Plane Function (UPF) 437, 5GC Session Management Function (SMF) 438, 5GC Authentication and Security Function (AUSF) 439, Policy Control Function (PCF 440), and 5GC Unified Data Manager (UDM) 441.

UE 410 attaches to LTE eNodeB 423 in EN-DC node 420 and UE 410 indicates its 5GNR capability. LTE eNodeB 423 requests data service for UE 410 from LTE MME 431 over S1-MME signaling and indicates the 5GNR capability of UE 410. LTE MME 431 interacts with HSS 435 to authenticate and authorize LTE/5GNR UE 410 for wireless data services that are represented by Access Point Names (APNs). LTE MME 431 generates 5GNR instructions for 5GNR/LTE UE 410 in response to the 5GNR UE capability and the UE authorization. LTE MME 431 transfers the APNs for UE 410 to LTE PGW 433 over LTE SGW 432. LTE PGW 433 interacts with LTE PCRF 434 to select Quality-of-Service Class Identifiers (QCIs) and network addresses for UE 410 based on the APNs. LTE PGW 433 transfers the APNs, QCIs, and network addresses for UE 410 to LTE MME 431 over LTE SGW 432. MME 431 transfers the APNs, QCIs, network address, and the 5GNR instructions for UE 410 to LTE eNodeB 423. LTE eNodeB 423 transfers the selected APNs, QCIs, network addresses, and 5GNR instructions to UE 410. LTE PGW 433 exchanges user data for UE 410 with external systems. LTE PGW 433 exchanges the user data with SGW 432 which exchanges the user data with LTE eNodeB 423. LTE eNodeB 423 exchanges the user data with UE 410.

In response to the 5GNR instructions, UE 410 measures the signal strength of the 5GNR pilot signal from 5GNR gNodeB 422 and transfers the 5GNR signal strength measurement to LTE eNodeB 423. LTE eNodeB 423 determines frequency offset, hysteresis, and sector power ratio for 5GNR gNodeB 422. For example, LTE eNodeB 423 may store a data structure for sector power ratio values and frequency offsets for multiple 5GNR gNodeBs. LTE eNodeB 423 determines the B1 addition threshold for 5GNR gNodeB 422 based on the sector power ratio for 5GNR gNodeB 422. Typically, LTE eNodeB 423 selects a relatively high B1 addition threshold when the sector power ratio of 5GNR gNodeB 422 is relatively high. Likewise, LTE eNodeB 423 selects a relatively low B1 addition threshold when the sector power ratio of 5GNR gNodeB 422 is relatively low.

LTE eNodeB 423 determines an Inter Radio Access Technology (inter-RAT) addition value for 5GNR gNodeB 422. The inter-RAT addition value comprises a sum of the 5GNR signal strength, the frequency offset, and the hysteresis. LTE eNodeB 423 determines when the inter-RAT addition value for 5GNR gNodeB 422 is greater than the B1 addition threshold for 5GNR gNodeB 422. When the inter-RAT addition value is greater than the B1 addition threshold, LTE eNodeB 423 directs 5GNR gNodeB 422 to serve UE 410 and directs UE 410 to attach to 5GNR gNodeB 422. LTE MME 431 directs LTE SGW 432 to serve UE 410 over 5GNR gNodeB 422. In response, LTE SGW 432 exchanges user data for UE 410 with 5GNR gNodeB 422. 5GNR gNodeB 422 exchanges the user data with UE 410.

LTE eNodeB 423 determines a B1 drop threshold for 5GNR gNodeB 422 based on the sector power ratio for 5GNR gNodeB 422. The B1 drop threshold may be a different value than the B1 addition threshold. LTE eNodeB 423 receives subsequent 5GNR signal strength measurements for 5GNR gNodeB 422 from UE 410. LTE eNodeB 423 determines an inter-RAT drop value for 5GNR gNodeB 422 based on the sum of the subsequent 5GNR signal strength, the frequency offset, and the hysteresis. When the inter-RAT drop value is lower than the B1 drop threshold, LTE eNodeB 423 signals 5GNR gNodeB 422 to stop serving UE 410 and signals UE 410 to detach from 5GNR gNodeB 422. LTE MME 431 directs LTE SGW 432 to stop serving UE 410 over 5GNR gNodeB 422. In response, LTE SGW 432 stops exchanging user data for UE 410 with 5GNR gNodeB 422. 5GNR gNodeB 422 stops exchanging the user data with UE 410.

Note that 5GNR gNodeB 421 and 5GNR gNodeB 424 use different types of 5GNR. The different types of 5GNR may have different resource block time intervals and resource block bandwidths. For example, 5GNR gNodeB 424 may provide an enhanced video broadcast service with unique time intervals and bandwidths. Some 5GNR UEs are not capable of using both types of 5GNR, but 5GNR UE 411 is capable of using both types of 5GNR. 5GNR UE 411 attaches to 5GNR gNodeB 421 and indicates its 5GNR capability for multiple 5GNR types.

5GNR gNodeB 421 requests data service for UE 411 from 5GC AMF 436 over N2 signaling the indicates the 5GNR capability for UE 411. 5GC AMF 436 interacts with 5GC SMF 438, 5GC AUSF 439, 5GC UDM 441, and 5GC PCF 440 to authenticate and authorize 5GNR UE 411 for 5GNR data services. 5GC AMF 436 generates 5GNR instructions responsive to the 5GNR UE capability and the 5GNR authorization. 5GC AMF 436 transfers quality-of-service metrics, network addressing, and 5GNR instructions for UE 411 to 5GNR gNodeB 421 and 5GC SMF 438. 5GC SMF 438 directs 5GC UPF 437 to serve UE 411 per the quality-of-service metrics and network addressing over 5GNR gNodeB 421. 5GNR gNodeB 421 transfers the quality-of-service metrics, network addressing, and 5GNR instructions to UE 411.

In response to the 5GNR instructions, UE 411 measures 5GNR signal strength for 5GNR gNodeB 424 and wirelessly transfers the 5GNR signal strength to 5GNR gNodeB 421. 5GNR gNodeB 421 determines sector power ratio, frequency offset, and hysteresis for 5GNR gNodeB 424. 5GNR gNodeB 421 determines an inter-RAT addition threshold for 5GNR gNodeB 424 based on the sector power ratio. 5GNR gNodeB 421 determines an inter-RAT addition value for 5GNR gNodeB 424 based on the 5GNR signal strength, the frequency offset, and the hysteresis.

5GNR gNodeB 421 determines when the inter-RAT addition value for 5GNR gNodeB 424 is greater than the inter-RAT addition threshold for 5GNR gNodeB 424. When the inter-RAT addition value is greater than the inter-RAT addition threshold, 5GNR gNodeB 421 directs 5GNR gNodeB 424 to serve UE 411 and directs UE 411 to attach to 5GNR gNodeB 424. 5GNR gNodeB 421 notifies 5GC AMF 436 of the 5GNR attachment, and 5GC AMF 436 directs 5GC SMF 438 to direct 5GC UPF 437 to serve UE 411 per the quality-of-service metrics and network addressing over 5GNR gNodeB 424. 5GNR UE 411 attaches to 5GNR gNodeB 424 and 5GNR gNodeB 424 exchanges user data with UE 411.

5GNR gNodeB 421 determines an inter-RAT drop threshold for 5GNR gNodeB 424 based on the sector power ratio. 5GNR gNodeB 421 receives subsequent 5GNR signal strength measurements from UE 411. 5GNR gNodeB 421 determines an inter-RAT drop value for 5GNR gNodeB 424 based on the subsequent 5GNR signal strength, the frequency offset, and the hysteresis. When the drop value is lower than the drop threshold, 5GNR gNodeB 421 signals UE 411 to detach from 5GNR gNodeB 424 and 5GNR gNodeB 424 stops exchanging the user data with UE 411.

Advantageously, LTE eNodeB 423 effectively and efficiently manipulates B1 add/drop thresholds to mitigate the interference that propagates from 5GNR sectors into neighboring sectors. Likewise, 5GNR gNodeB 421 effectively and efficiently manipulates the inter-RAT add/drop thresholds to mitigate 5GNR interference.

In some examples, UEs 410-411 select B1 add/drop thresholds based on sector power ratios. UEs 410-411 apply signal metrics from 5GNR gNodeBs 422 and 424 to the B1 thresholds to trigger 5GNR measurement reports to LTE eNodeB 423 and 5GNR gNodeB 421 indicating the signal metrics.

Figure 5:
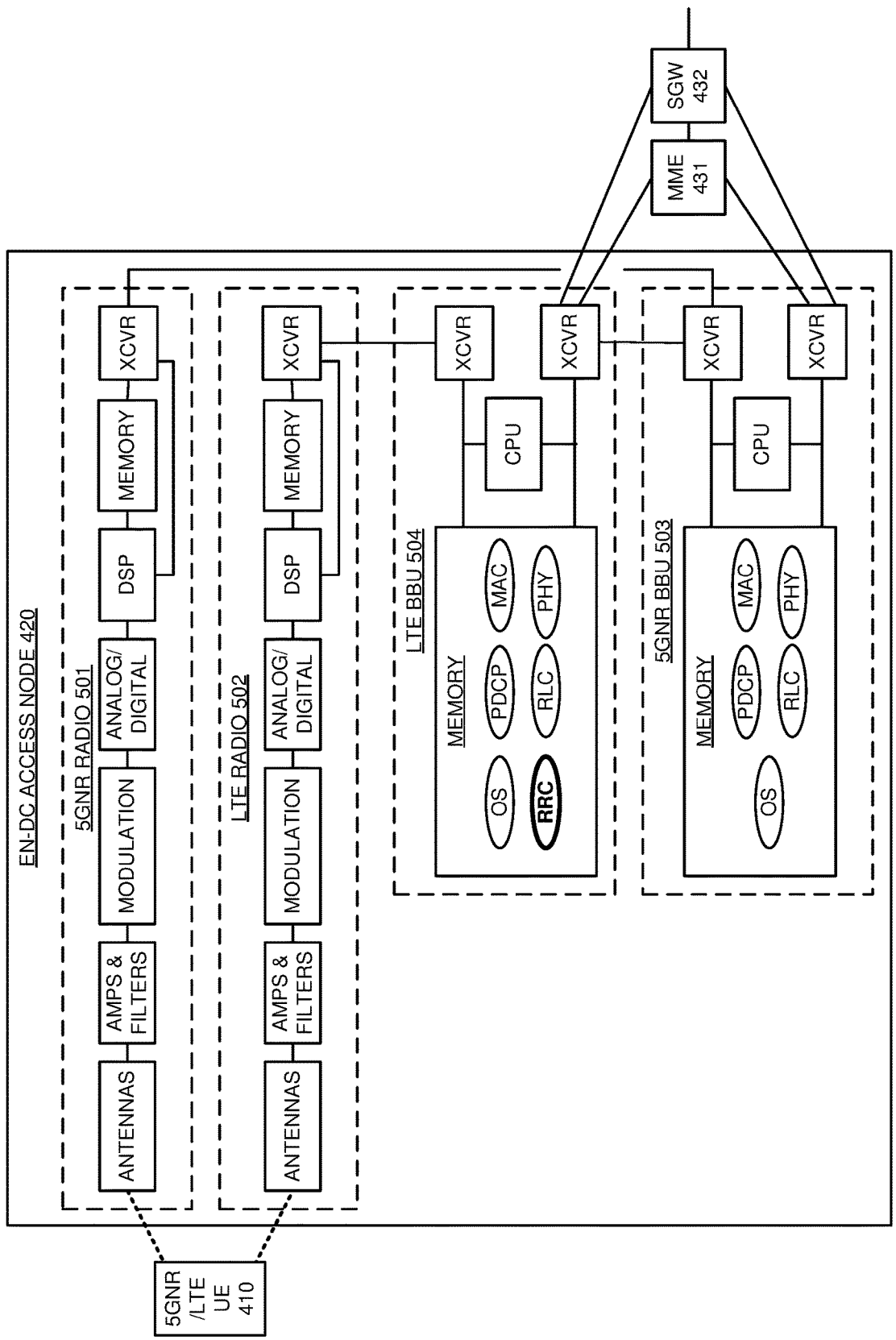
FIG. 5 illustrates an Evolved Universal Terrestrial Radio Access Network Dual Connectivity (EN-DC) access node to serve UEs over 5GNR gNodeBs based on sector power ratio.

FIG. 5 illustrates EN-DC access node 420 to serve UE 410 over 5GNR based on sector power ratio. EN-DC access node 420 is an example of wireless access node 120, although wireless access node 120 may differ. EN-DC access node 420 comprises 5GNR radio 501, LTE radio 502, 5GNR Baseband Unit (BBU) 503, and LTE BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPU in BBUs 503-504 execute the operating systems, PHYs, MACs, RLCs, PDCPs, and RRCs to exchange network signaling with UE 410 and MME 431 and to exchange user data between UE 410 and SGW 432.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in 5GNR radio 501 over a 5GNR link. The transceiver in 5GNR radio 501 is coupled to a transceiver in 5GNR BBU 503 over Common Public Radio Interface (CPRI) links. A transceiver in 5GNR BBU 503 is coupled to MME 431 and SGW 432 over backhaul links. UE 410 is wirelessly coupled to the antennas in LTE radio 502 over an LTE link. The transceiver in LTE radio 502 is coupled to a transceiver in LTE BBU 504 over CPRI links. A transceiver in LTE BBU 504 is coupled to MME 431 and to SGW 432 over backhaul links. A transceiver in 5GNR BBU 503 is coupled to a transceiver in LTE BBU 504 over X2 links.

UE 410 wirelessly attaches to LTE antennas in LTE radio 502. The LTE antennas in LTE radio 502 receive wireless LTE signals from UE 410 that transport Uplink (UL) LTE signaling, UL LTE data, and indicate 5GNR capability for UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capability of UE 410, to MME 431 over the backhaul links. MME 431 authenticates and authorizes 5GNR service for UE 410, and in response to the authorization, MME 431 generates 5GNR instructions for UE 410. The PDCP transfers the UL LTE data to LTE SGW 432 over the backhaul links.

In LTE BBU 504, the LTE RRC receives the DL S1-MME signaling and the 5GNR instructions from MME 431. The PDCP receives DL LTE data from SGW 432. The LTE network applications process the new DL LTE signaling and the DL LTE data to generate corresponding DL LTE symbols that carry the DL LTE signaling and DL LTE data. In LTE radio 502, the DSP processes the DL LTE symbols to generate corresponding digital signals for the analog-to-digital interfaces. The analog-to-digital interfaces convert the digital DL signals into analog DL signals for modulation.

Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and 5GNR instructions to UE 410.

In response to the 5GNR instructions, UE 410 measures 5GNR signal strength for 5GNR gNodeBs. UE 410 wirelessly transfers the 5GNR signal strength to LTE radio 502. LTE radio 502 exchanges the 5GNR signal strength with LTE BBU 504 over the CPRI links. LTE RRC in LTE BBU 504 determines the sector power ratio, the frequency offset, and the hysteresis for 5GNR radio 501. The LTE RRC in BBU 504 determines a B1 add threshold for 5GNR BBU 503 based on the sector power ratio for 5GNR radio 501. The LTE RRC in BBU 504 determines an inter-RAT add value for 5GNR BBU 503 based on the sum of the 5GNR signal strength, the frequency, and the hysteresis. The LTE RRC in BBU 504 determines when the inter-RAT add value is greater than the B1 add threshold.

When the inter-RAT add value exceeds the B1 add threshold, the LTE RRC in BBU 504 directs the 5GNR PDCP in BBU 503 to serve UE 410. The LTE RRC in BBU 504 also directs UE 410 to attach to the 5GNR PDCP in 5GNR BBU 503. UE 410 attaches to the 5GNR PDCP in BBU 503 over 5GNR radio 501. The LTE RRC in BBU 504 notifies MME 431 of the 5GNR attachment. MME 431 directs SGW 432 to serve UE 410 over 5GNR BBU 503. SGW 432 exchanges 5GNR data with the 5GNR PDCP in 5GNR BBU 503. The 5GNR PDCP in BBU 503 exchanges the 5GNR data with the 5GNR PDCP in UE 410 over the RLCs, MACs, and PHYs.

In 5GNR radio 501, the antennas receive wireless 5GNR signals from UE 410 that transport Uplink (UL) 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 504 to generate new UL X2 signaling and new DL 5GNR signaling. The 5GNR PDCP transfers the new UL X2 signaling to the LTE RRC in BBU 504. The 5GNR PDCP transfers the UL 5GNR data to SGW 432 over backhaul links.

In 5GNR BBU 503, the 5GNR PDCP receives the DL X2 signaling from the LTE RRC in BBU 504. The 5GNR PDCP also receives DL 5GNR data from SGW 432. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to UE 410.

In this example, the LTE RRC in LTE BBU 504 also determines a B1 drop threshold for 5GNR BBU 503 based on the sector power ratio for 5GNR radio 501. The LTE RRC in BBU 504 wirelessly receives a subsequent 5GNR signal strength measurement from UE 410. The LTE RRC in LTE BBU 504 determines an inter-RAT drop value for 5GNR BBU 503 based on the subsequent 5GNR signal strength, the frequency offset, and the hysteresis. The LTE RRC in LTE BBU 504 stops the service to UE 410 over 5GNR radio 501 when the inter-RAT drop value is less than the B1 drop threshold. When the inter-RAT drop value is less than the B1 drop threshold, the LTE RRC in LTE BBU 504 directs the 5GNR PDCP in BBU 503 to stop serving UE 410 and notifies MME 431. The LTE RRC in LTE BBU 504 directs UE 410 to detach from 5GNR PDCP in 5GNR BBU 503. UE 410 wirelessly detaches from 5GNR BBU 503. MME 431 directs SGW 432 to stop serving UE 410 over 5GNR BBU 503. SGW 432 stops exchanging 5GNR data with the 5GNR PDCP in 5GNR BBU 503. The 5GNR PDCP in BBU 503 stops exchanging the 5GNR data with the 5GNR PDCP in UE 410 over the RLCs, MACs, and PHYs.

Figure 6:
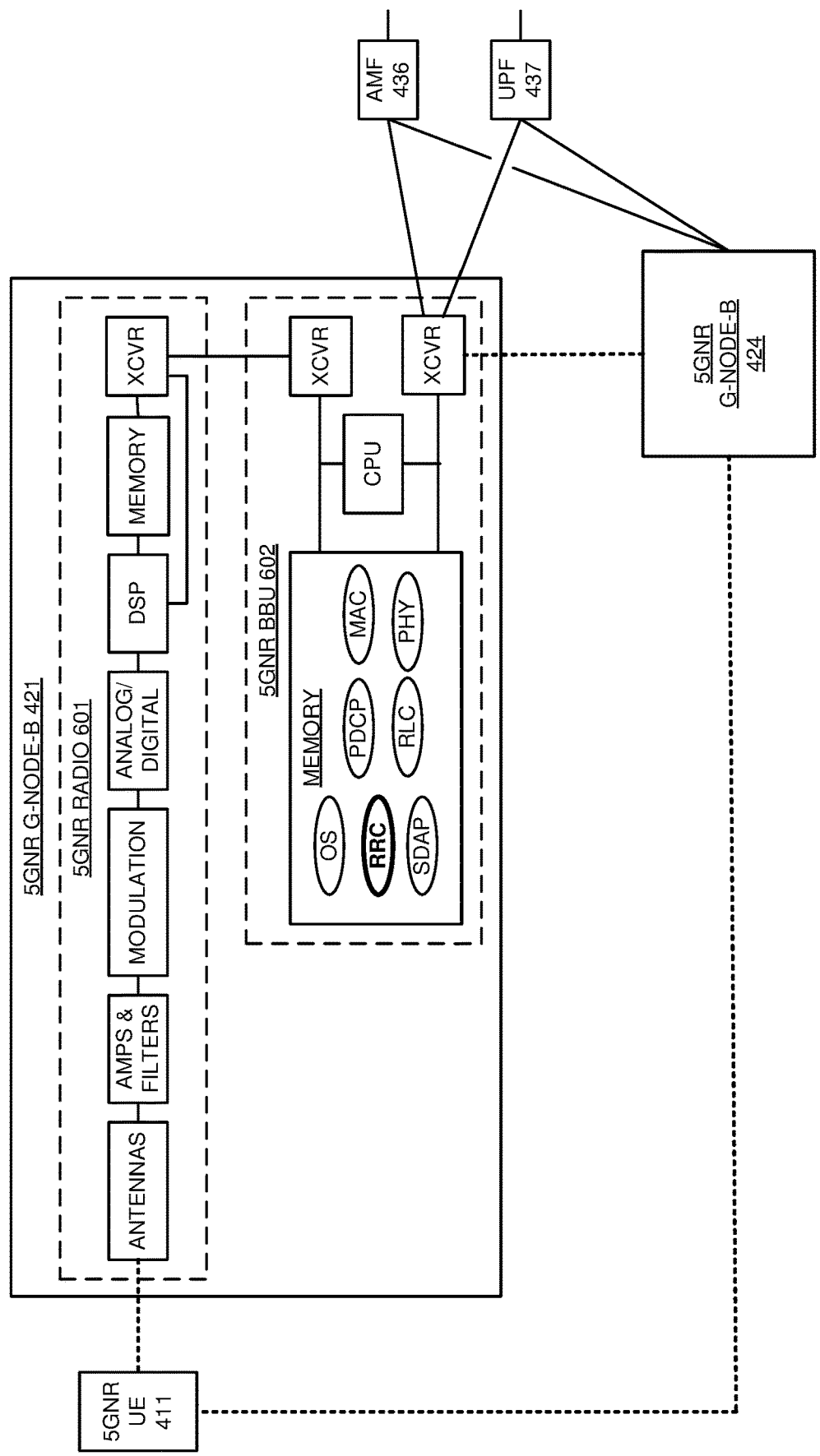
FIG. 6 illustrates a 5GNR gNodeB to serve UEs based on sector power ratio.

FIG. 6 illustrates 5GNR gNodeB 421 to serve 5GNR UE 411 over 5GNR based on sector power ratio. 5GNR gNodeB 421 is an example of wireless access node 120, although access node 120 may differ. 5GNR gNodeB 421 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 436 and to exchange user data between 5GNR UE 411 and UPF 437.

5GNR UE 411 is wirelessly coupled to the antennas in 5GNR radio 601 over a 5GNR link. The transceiver in 5GNR radio 601 is coupled to a transceiver in 5GNR BBU 602 over CPRI links. A transceiver in 5GNR BBU 602 is coupled to AMF 436 and UPF 437 over backhaul links. In 5GNR radio 601, the antennas receive wireless 5GNR signals from 5GNR UE 411 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL N2 signaling from AMF 436 to generate new UL N2 signaling and new DL 5GNR signaling. The 5GNR RRC transfers the new UL N2 signaling to AMF 436. The 5GNR SDAP transfers the UL 5GNR data to UPF 437 over backhaul links.

In 5GNR BBU 602, the 5GNR RRC receives the DL N2 signaling from AMF 436. The 5GNR SDAP receives DL 5GNR data from UPF 437. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 411.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

5GNR UE 411 attaches to 5GNR RRC in BBU 602 in indicates is capability to handle various types of 5GNR. The 5GNR RRC in BBU 602 requests data service for UE 411 from 5GC AMF 436 over N2 signaling and indicates its 5GNR capabilities. 5GC AMF 436 interacts with 5GC SMF 438, 5GC AUSF 439, 5GC UDM 441, and 5GC PCF 440 to authenticate and authorize 5GNR UE 411 for 5GNR data services. 5GC AMF 436 generates 5GNR instructions for 5GNR UE 411 responsive to UE capabilities and the authorization. 5GC AMF 436 transfers quality-of-service metrics, network addressing, and 5GNR instructions for UE 411 to the 5GNR RRC in BBU 602 and 5GC SMF 438. 5GC SMF 438 directs 5GC UPF 437 to serve UE 411 per the quality-of-service metrics and network addressing over 5GNR gNodeB 421. The 5GNR RRC in BBU 602 transfers the quality-of-service metrics, network addressing, and 5GNR instructions to UE 411.

In response to the 5GNR instructions, UE 411 measures 5GNR signal strength for 5GNR gNodeB 424 and wirelessly transfers the 5GNR signal strength to the 5GNR RRC in BBU 602 over 5GNR radio 601. The 5GNR RRC in BBU 602 determines sector power ratio, frequency offset, and hysteresis for 5GNR gNodeB 424. The 5GNR RRC in BBU 602 determines an inter-RAT addition threshold for 5GNR gNodeB 424 based on the sector power ratio. 5GNR gNodeB 421 determines an inter-RAT addition value for 5GNR gNodeB 424 based on the 5GNR signal strength, the frequency offset, and the hysteresis.

The 5GNR RRC in BBU 602 determines when the inter-RAT addition value for 5GNR gNodeB 424 is greater than the inter-RAT addition threshold for 5GNR gNodeB 424. When the inter-RAT addition value is greater than the inter-RAT addition threshold, the 5GNR RRC in BBU 602 directs 5GNR gNodeB 424 to serve UE 411 and directs UE 411 to attach to 5GNR gNodeB 424. 5GNR gNodeB 421 notifies 5GC AMF 436. 5GC AMF 436 directs 5GC SMF 438 to direct 5GC UPF 437 to serve UE 411 per the quality-of-service metrics and network addressing over 5GNR gNodeB 424. 5GNR UE 411 attaches to 5GNR gNodeB 424 and 5GNR gNodeB 424 exchanges user data with UE 411.

The 5GNR RRC in BBU 602 determines an inter-RAT drop threshold for 5GNR gNodeB 424 based on the sector power ratio. The 5GNR RRC in BBU 602 receives subsequent 5GNR signal strength measurements from UE 411. The 5GNR RRC in BBU 602 determines an inter-RAT drop value for 5GNR gNodeB 424 based on the subsequent 5GNR signal strength, the frequency offset, and the hysteresis. When the drop value is lower than the drop threshold, the 5GNR RRC in BBU 602 signals UE 411 to detach from 5GNR gNodeB 424 and 5GNR gNodeB 424 stops exchanging the user data with UE 411.

Figure 7:
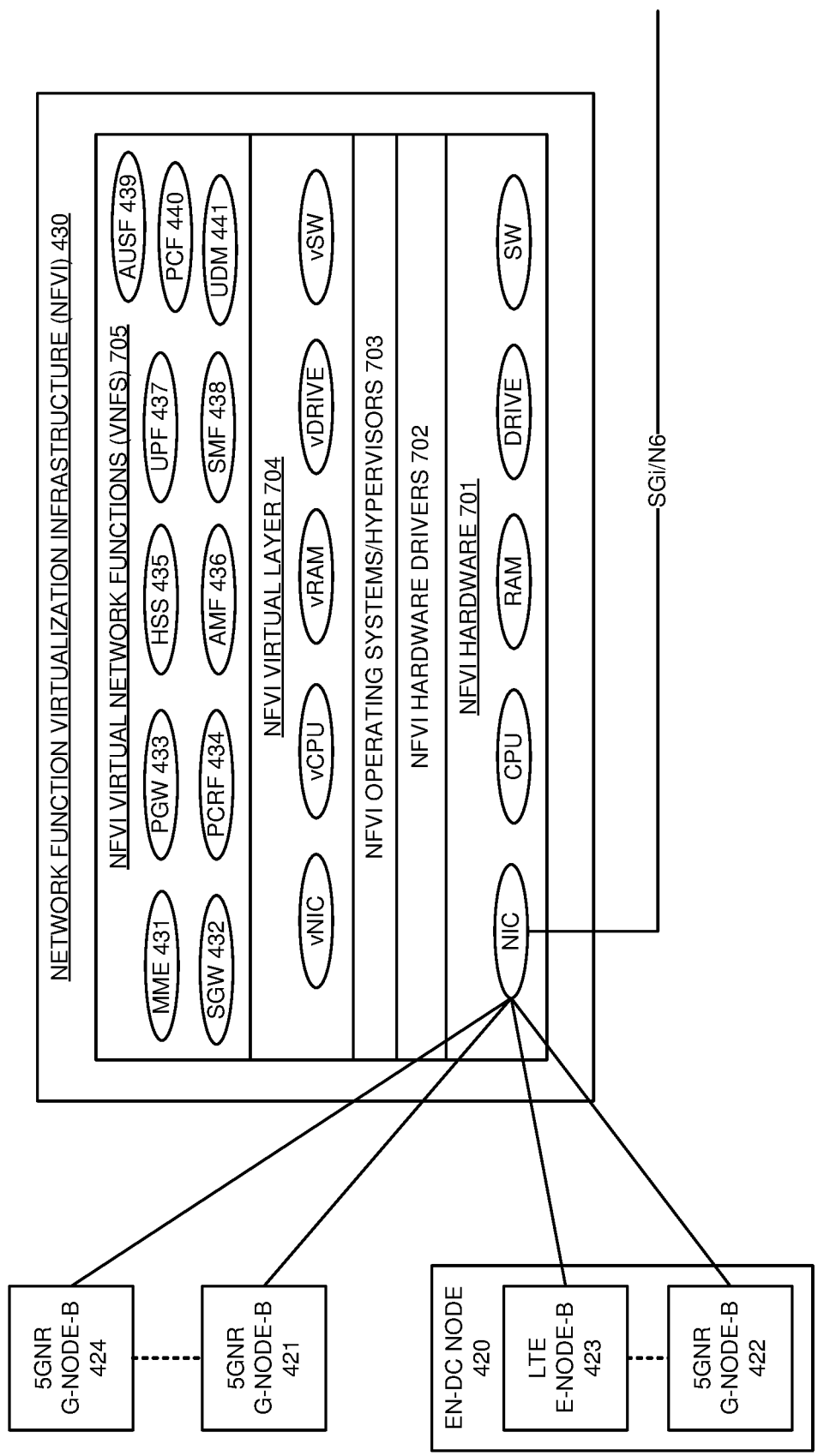
FIG. 7 illustrates a Network Function Virtualization Infrastructure (NFVI) to serve UEs over 5GNR gNodeBs based on sector power ratio.

FIG. 7 illustrates Network Function Virtualization Infrastructure (NFVI) 430 to serve UEs 410-411 over 5GNR based on sector power ratio. NFVI 430 is an example of network elements 150, although network elements 150 may differ. NFVI 430 comprises NFVI hardware 701, NFVI hardware drivers 702, NFVI operating systems and hypervisors 703, NFVI virtual layer 704, and NFVI Virtual Network Functions (VNFs) 705. NFVI hardware 701 comprises Network Interface Cards (NIC), CPU, RAM, flash/disk drives, and data switches (SWS). NFVI virtual layer 704 comprises virtual NICs (vNIC), virtual CPUs (vCPU), virtual RAM (vRAM), virtual Drives (vDRIVE), and virtual Switches (vSW). The NIC are coupled to NodeBs 421-424 over backhaul links. The NIC are coupled to external systems over SGi and N6 links. NFVI VNFs 705 comprise MME 431, SGW 432, PGW 433, PCRF 434, HSS 435, AMF 436, UPF 437, SMF 438, AUSF 439, PCF 440, and UDM 441. Other LTE and 5GC VNFs are typically present but are omitted for clarity. NFVI hardware 701 executes NFVI hardware drivers 702, NFVI operating systems and hypervisors 703, NFVI virtual layer 704, and NFVI VNFs 705 to serve UEs with the data service over NodeBs 421-424 based on the sector power ratios of the 5GNR NodeBs.

MME 431 receives S1-MME signaling from LTE eNodeB 423 that requests data services for UE 410 and indicates its 5GNR UE capabilities. MME 431 interacts with HSS 435 to authenticate and authorize UE 410 for wireless data services that are represented by APNs. MME 431 generates 5GNR instructions for UE 411 responsive to the 5GNR UE capabilities and the authorization. MME 431 transfers the APNs for UE 410 and UE 412 to PGW 433 over SGW 432. PGW 433 interacts with PCRF 434 to select QCIs and network addresses for UE 410 based on the APNs. PGW 433 transfers the APNs, QCIs, and addresses to MME 431 over SGW 432. MME 431 transfers the APNs, QCIs, network addresses, and 5GNR instructions for UE 410 to LTE eNodeB 423. MME 431 receives S1-MME signaling from LTE eNodeB 423 for UE 410. PGW 433 exchanges user data for UE 410 with external systems. LTE PGW 433 exchanges the user data with SGW 432 which exchanges the user data with LTE eNodeB 423 and 5GNR gNodeB 422. In some examples, SGW 432 and PGW 433 are integrated together into a System Architecture Evolution Gateway (SAE GW) in NFVI 430.

AMF 436 receives N2 signaling from 5GNR gNodeB 421 that requests data service for UE 411 and indicates its 5GNR UE capabilities. AMF 436 interacts with SMF 438, AUSF 439, PCF 440, and UDM 441 to authenticate and authorize 5GNR UE 411 for 5GNR data services. AMF 436 generates 5GNR instructions responsive to the 5GNR UE capabilities and the authorization. AMF 436 transfers quality-of-service metrics, network addressing, and the 5GNR instructions for 5GNR UE 411 to 5GNR gNodeB 421. SMF 438 directs UPF 437 to serve UE 411 over 5GNR gNodeB 421 per the quality-of-service metrics and network addressing. AMF 437 receives N2 signaling from 5GNR gNodeB 421 indicating 5GNR attachment per the 5GNR instructions. AMF 436 directs SMF 438 drive UPF 437 to serve UE 411 over 5GNR gNodeB 424 per the quality-of-service metrics and network addressing.

Figure 8:
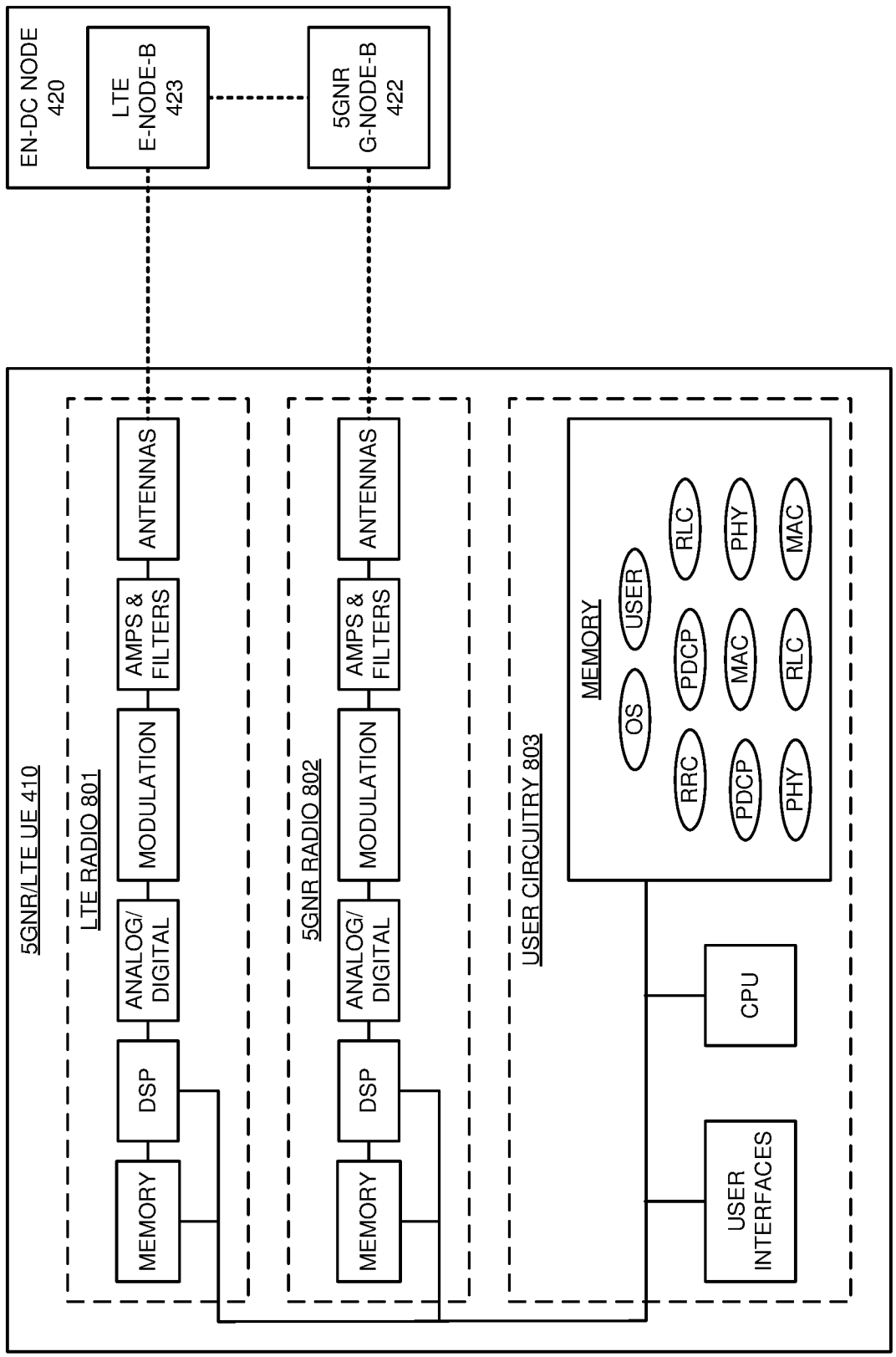
FIG. 8 illustrates a 5GNR/LTE UE that is served by an EN-DC access node based on sector power ratio.

FIG. 8 illustrates 5GNR/LTE UE 410 that is served by EN-DC access node 420 over 5GNR based on sector power ratio. 5GNR/LTE UE 410 is an example of UE 101, although UE 101 may differ. UE 410 comprises LTE radio 801, 5GNR radio 802, and user circuitry 803 that are coupled over bus circuitry. Radios 801-802 comprise antennas, amplifiers, filters, modulation, analog-to-digital interfaces, DSP, and memory that are coupled over bus circuitry. User circuitry 803 comprises user interfaces, CPU, and memory that are coupled over bus circuitry.

The antennas in radios 801-802 are wirelessly coupled to NodeBs 422-423 on EN-DC node 420. The user interfaces in user circuitry 803 comprise graphic displays, machine controllers, sensors, cameras, transceivers, and/or some other user components. The memory in user circuitry 803 stores an operating system, user applications (USER), and network applications (PHY, MAC, RLC, PDCP, and RRC). The CPU in user circuitry 803 executes the operating system and the user applications to generate and consume user data. The CPU in user circuitry 803 executes the operating system and the network applications to wirelessly exchange corresponding signaling and data with NodeBs 422-423 over radios 801-802.

The LTE RRC in UE 410 wirelessly attaches to LTE eNodeB 423 over antennas in LTE radio 801. The LTE RRC in UE 410 generates UL LTE signaling and UL LTE data. The UL signaling indicates 5GNR capability for UE 410. The LTE network applications in UE 410 process the UL LTE signaling and the UL LTE data to generate corresponding UL LTE symbols that carry the UL LTE signaling, UL LTE data, and 5GNR capability. The LTE DSP in LTE radio 801 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5GNR UE capability) and UL LTE data for UE 410 to LTE eNodeB 423.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates the 5GNR instructions, APNs, QCIs, and network addresses from LTE eNodeB 423.

In response to the 5GNR instructions, the LTE RRC in UE 410 directs the 5GNR PHYs to measure 5GNR signal strength of the 5GNR signal from 5GNR gNodeB 422. The 5GNR PHYs report the 5GNR signal strength to the LTE RRC. The LTE RRC in UE 410 transfers the 5GNR signal strength to LTE eNodeB 423. When the inter-RAT addition value is greater than the B1 addition threshold, LTE eNodeB 423 directs the 5GNR PDCP in UE 410 to attach to 5GNR gNodeB 422. 5GNR gNodeB 422 exchanges user data for UE 410 with the 5GNR PDCP in UE 410.

LTE eNodeB 423 determines a B1 drop threshold for 5GNR gNodeB 422 based on the sector power ratio for 5GNR gNodeB 422. The LTE RRC in UE 410 directs the 5GNR PHYs to measure subsequent 5GNR signal strength of the 5GNR signal from 5GNR gNodeB 422. The 5GNR PHYs report the subsequent 5GNR signal strength to the LTE RRC. The LTE RRC in UE 410 wirelessly transfers the subsequent 5GNR signal strength measurement to LTE eNodeB 423. When the inter-RAT drop value is lower than the B1 drop threshold, LTE eNodeB 423 signals the 5GNR PDCP in UE 410 to detach from 5GNR gNodeB 422. The 5GNR PDCP in UE 410 detaches from 5GNR gNodeB 422.

Figure 9:
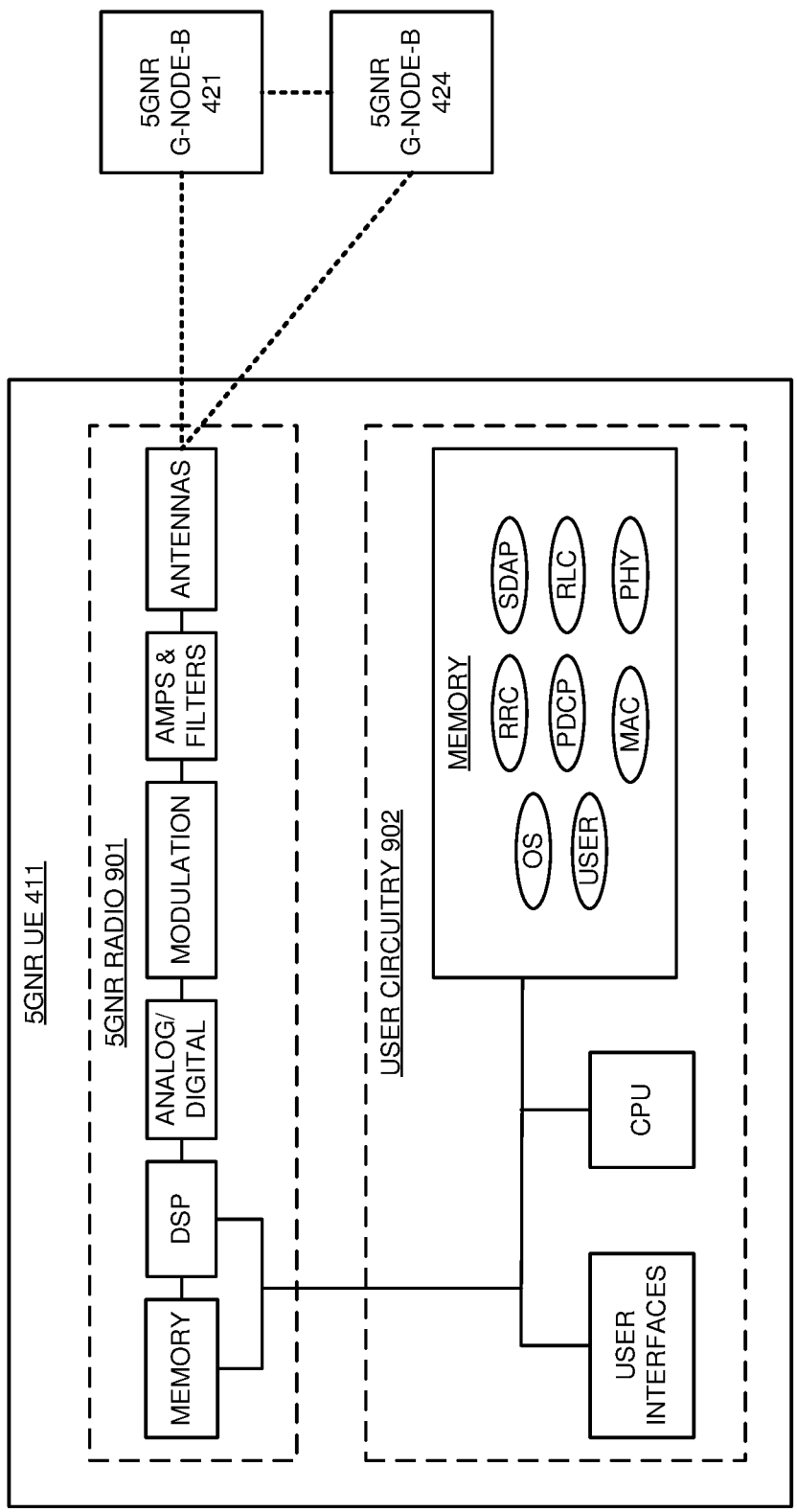
FIG. 9 illustrates a 5GNR UE that is served by 5GNR gNodeBs based on sector power ratio.

FIG. 9 illustrates 5GNR UE 411 that is served by 5GNR gNodeB 421 over 5GNR based on sector power ratio. 5GNR UE 411 is an example of UE 101, although UE 101 may differ. UE 411 comprises 5GNR radio 901 and user circuitry 902 that are coupled over bus circuitry. 5GNR radios 901 comprises antennas, amplifiers, filters, modulation, analog-to-digital interfaces, DSP, and memory that are coupled over bus circuitry. User circuitry 902 comprises user interfaces, CPU, and memory that are coupled over bus circuitry. The antennas in 5GNR radio 901 are wirelessly coupled to 5GNR gNodeBs 421 and 424. The user interfaces in user circuitry 902 comprise graphic displays, machine controllers, sensors, cameras, transceivers, and/or some other user components. The memory in user circuitry 902 stores an operating system, user applications, and network applications (PHY, MAC, RLC, PDCP, SDAP, and RRC). The CPU in user circuitry 902 executes the operating system and the user applications to generate and consume user data. The CPU in user circuitry 902 executes the operating system and the network applications to wirelessly exchange corresponding signaling and data with 5GNR gNodeBs 421 and 424 over 5GNR radio 901.

The 5GNR RRC in UE 411 wirelessly attaches to 5GNR gNodeB 421 over antennas in 5GNR radio 901. The 5GNR RRC generates 5GNR signals that transport UL 5GNR signaling and UL 5GNR data. The 5GNR signaling indicates 5GNR capabilities for UE 411—including UE capabilities for different types of 5GNR. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 901 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating 5GNR capabilities) and UL 5GNR data for UE 411 to 5GNR gNodeB 421.

The 5GNR antennas 5GNR radio 901 receive wireless DL signals that have DL 5GNR signaling and DL 5GNR data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling and the DL 5GNR data. The DL 5GNR signaling has 5GNR instructions, QoS levels, network addresses, and the like.

In response to the 5GNR instructions, the 5GNR RRC in UE 411 directs the 5GNR PHYs in UE 411 to measures 5GNR signal strength for 5GNR gNodeB 424. The 5GNR PHYs report the 5GNR signal strength to the 5GNR RRC. The 5GNR RRC wirelessly transfers the 5GNR signal strength for gNodeB 424 to 5GNR gNodeB 421. When the inter-RAT addition value is greater than the inter-RAT addition threshold, 5GNR gNodeB 421 directs the 5GNR RRC in UE 411 to attach to 5GNR gNodeB 424. The 5GNR RRC in 5GNR UE 411 attaches to 5GNR gNodeB 424 and 5GNR gNodeB 424 exchanges user data with the 5GNR SDAP.

The 5GNR RRC in UE 411 directs the 5GNR PHYs in UE 411 to measure subsequent 5GNR signal strength for 5GNR gNodeB 424. The 5GNR PHYs report the subsequent 5GNR signal strength to the 5GNR RRC. The 5GNR RRC wirelessly transfers the subsequent 5GNR signal strength to 5GNR gNodeB 421. When the drop value is lower than the drop threshold, the 5GNR RRC in 5GNR gNodeB 421 signals the 5GNR RRC in UE 411 to detach from 5GNR gNodeB 424. 5GNR gNodeB 424 to stops exchanging the user data with UE 411.

Figure 10:
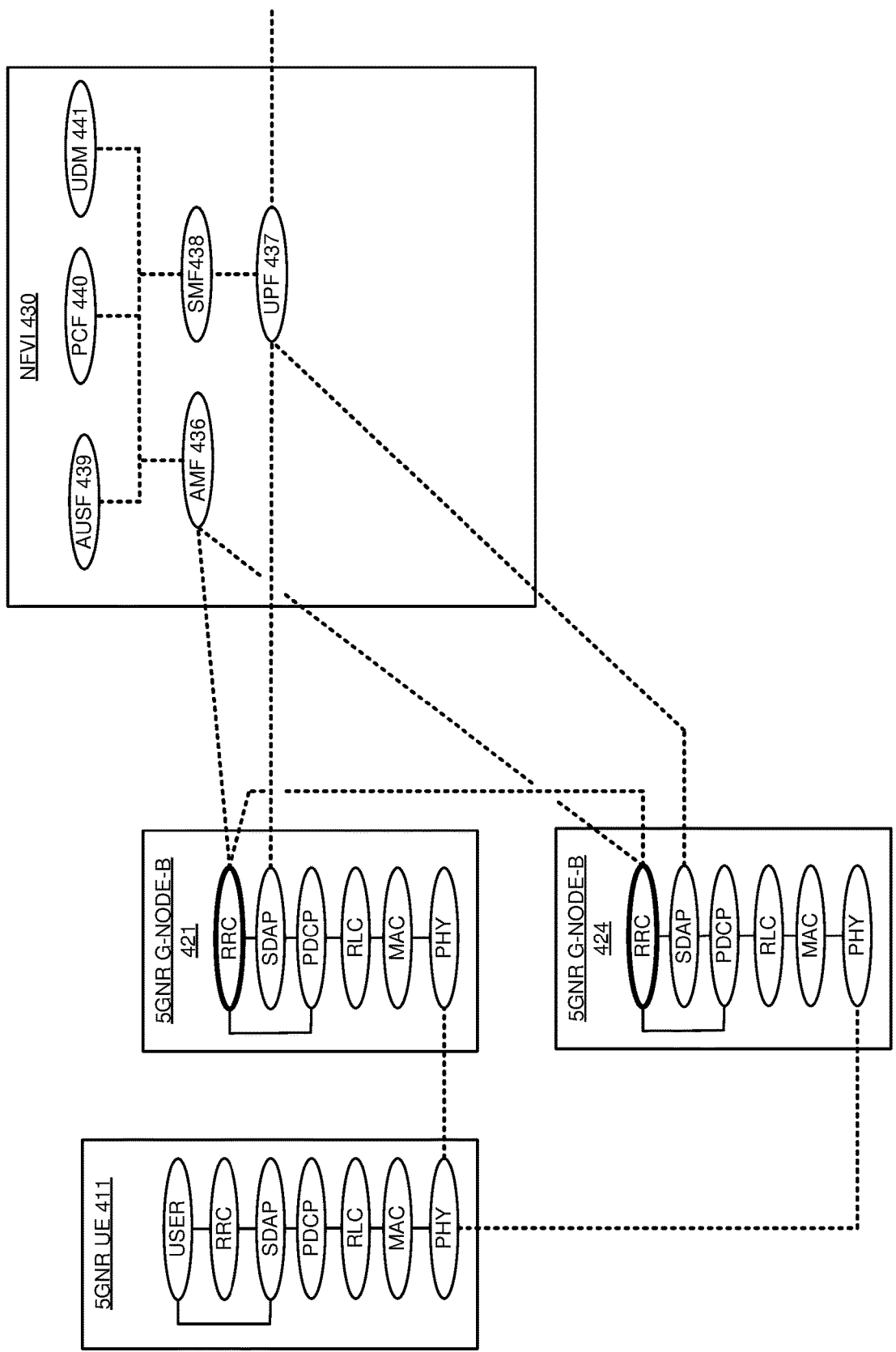
FIG. 10 illustrates an exemplary operation of the UEs, 5GNR gNodeB, and NFVI to serve the UEs over 5GNR based on sector power ratio.

FIG. 10 illustrates an exemplary operation of UE 411, 5GNR gNodeB 421, 5GNR gNodeB 424, and NFVI 430 to serve UE 411 over 5GNR based on sector power ratio. In 5GNR UE 411, a user application requests data communication, and the 5GNR RRC in UE 411 attaches to the 5GNR RRC in 5GNR gNodeB 421 over the 5GNR PDCPs, RLCs, MACs, and PHYs. The 5GNR RRC in 5GNR gNodeB 421 sends a request for data services for 5GNR UE 411 in N2 signaling to AMF 436 over the backhaul links.

AMF 436 interacts with SMF 438, AUSF 439, PCF 440, UDM 441, and typically other functions to authenticate and authorize 5GNR UE 411 for 5GNR data services. SMF 438 directs UPF 437 to serve UE 411 per the quality-of-service metrics and network addressing. AMF 436 generates 5GNR instructions responsive to the 5GNR authorization. AMF 436 transfers quality-of-service metrics, network addressing, and 5GNR instructions for UE 411 to the RRC in 5GNR gNodeB 421 in N2 signaling. The RRC in 5GNR gNodeB 421 transfers the quality-of-service metrics, network addressing, and 5GNR instructions to the RRC in UE 411 over the PDCPs, RLCs, MACs, and PHYs.

In response to the 5GNR instructions, the 5GNR RRC in 5GNR UE 411 directs the 5GNR PHYs in UE 411 to measure 5GNR signal strength for 5GNR gNodeB 424. The 5GNR PHYs report the 5GNR signal strength to the 5GNR RRC. The 5GNR RRC wirelessly transfers the 5GNR signal strength to the 5GNR RRC in 5GNR gNodeB 421 over the PDCPs, RLCs, MACs, and PHYs. The 5GNR RRC in 5GNR gNodeB 421 determines the sector power ratio, the frequency offset, and the hysteresis for 5GNR gNodeB 424.

The 5GNR RRC in 5GNR gNodeB 421 determines an inter-RAT addition threshold for 5GNR gNodeB 424 based on the sector power ratio.

The 5GNR RRC in 5GNR gNodeB 421 determines an inter-RAT addition value for 5GNR gNodeB 424 based on the 5GNR signal strength, the frequency offset, and the hysteresis. The 5GNR RRC in 5GNR gNodeB 421 determines when the addition value is greater than the addition threshold for 5GNR gNodeB 424. When the 5GNR RRC in 5GNR gNodeB 421 determines the inter-RAT addition value is greater than the inter-RAT addition threshold, the 5GNR RRC in 5GNR gNodeB 421 directs the 5GNR RRC in 5GNR gNodeB 424 to serve UE 411. The 5GNR RRC in 5GNR gNodeB 421 directs UE 411 to attach to 5GNR gNodeB 424. The 5GNR RRC in UE 411 attaches to the 5GNR RRC in 5GNR gNodeB 424 over the 5GNR PDCPs, RLCs, MACs, and PHYs. The 5GNR RRC in 5GNR gNodeB 424 requests 5GNR service for UE 411 from AMF 436. UPF 437 exchanges user data for UE 411 with external systems. UPF 437 exchanges the user data with the SDAP in 5GNR gNodeB 424. The SDAP in 5GNR gNodeB 424 exchanges the user data with the SDAP in 5GNR UE 411 over the PDCPs, RLCs, MACs, and PHYs. The 5GNR SDAP in UE 411 exchanges the DL user data with the user applications.

The 5GNR RRC in 5GNR gNodeB 421 determines a drop threshold for 5GNR gNodeB 424 based on the sector power ratio for 5GNR gNodeB 424. The 5GNR RRC in UE 411 directs the 5GNR PHYs in UE 411 to measure subsequent 5GNR signal strength of 5GNR gNodeB 424. The 5GNR PHYs report the subsequent 5GNR signal strength to the 5GNR RRC. The 5GNR RRC in UE 411 transfers the subsequent 5GNR signal strength to the 5GNR RRC in 5GNR gNodeB 421. The 5GNR RRC in 5GNR gNodeB 421 determines a drop value for 5GNR gNodeB 424 based on the subsequent 5GNR signal strength, the frequency offset, and the hysteresis. The 5GNR RRC in 5GNR gNodeB 421 determines when the inter-RAT drop value is less than the inter-RAT drop threshold. When the inter-RAT drop value is less than the inter-RAT drop threshold, the 5GNR RRC in 5GNR gNodeB 421 directs the 5GNR RRC in 5GNR gNodeB 424 to stop serving UE 411 and directs the 5GNR RRC in UE 411 to detach from the 5GNR RRC in 5GNR gNodeB 424. The 5GNR RRC in 5GNR gNodeB 424 and the 5GNR RRC in UE 411 stop exchanging the 5GNR data over their PDCPs, RLCs, MACs, and PHYs.

Figure 11:
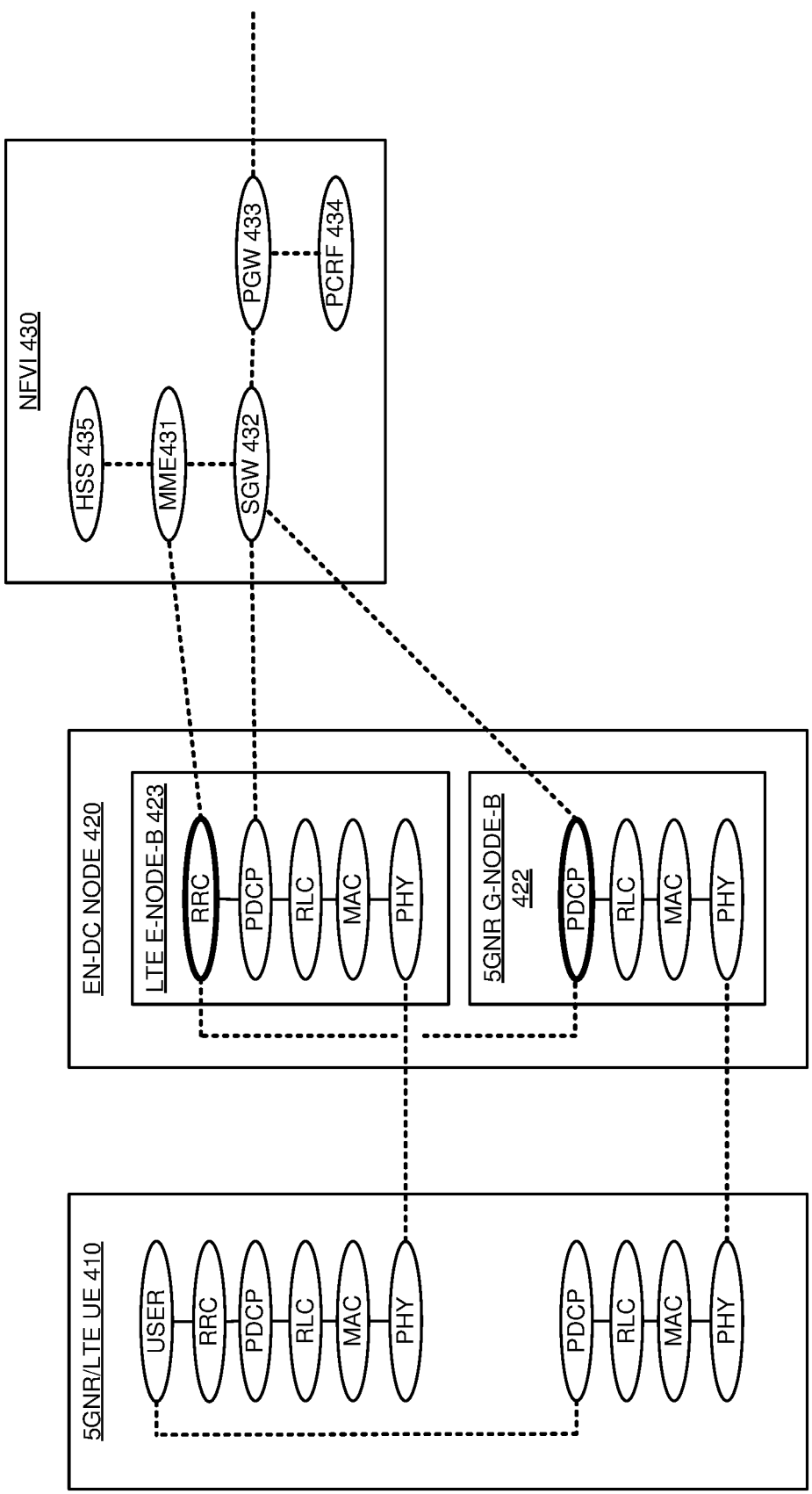
FIG. 11 illustrates an exemplary operation of the UEs, EN-DC access node, and NFVI to serve the 5GNR/LTE UE over 5GNR based on sector power ratio.

FIG. 11 illustrates an exemplary operation of 5GNR/LTE UE 410, EN-DC access node 420, and NFVI 430 to serve 5GNR/LTE UE 410 over 5GNR based on sector power ratio. In 5GNR/LTE UE 410, a user application requests data communication, and the LTE RRC in UE 410 attaches to the LTE RRC in LTE eNodeB 423 over the LTE PDCPs, RLCs, MACs, and PHYs. The LTE RRC in UE 410 indicates 5GNR capability for UE 410 to the LTE RRC in LTE eNodeB 423. The LTE RRC in LTE eNodeB 423 transfers S1-MME signaling to MME 431 that requests data services and indicates the 5GNR capability for LTE UE 410.

MME 431 interacts with HSS 435 to authenticate and authorize UE 410 for wireless data services by APNs. MME 431 generates 5GNR instructions for UE 410 in response to the 5GNR authorization and the 5GNR capability. MME 431 transfers the APNs for UE 410 to PGW 433 over SGW 432. PGW 433 interacts with PCRF 434 to select QCIs and network addresses for UE 410 based on the APNs. PGW 433 transfers the APNs, QCIs, and addresses to MME 431 over SGW 432. MME 431 transfers the APNs, QCIs, network address, and 5GNR instructions for UE 410 to the RRC in LTE eNodeB 423. The RRC in LTE eNodeB 423 transfers the APNs, QCIs, network address, and 5GNR instructions to the LTE RRC in UE 410 over the PDCPs, RLCs, MACs, and PHYs. PGW 433 exchanges the user data with SGW 432 which exchanges the user data with the PDCP in LTE eNodeB 423. The PDCP in LTE eNodeB 423 exchanges the user data with the LTE PDCP in UE 410 over the RLCs, MACs, and PHYs.

In response to the 5GNR instructions, the LTE RRC in UE 410 directs the 5GNR PHYs to measure 5GNR signal strength for 5GNR gNodeB 422. The 5GNR PHYs report the 5GNR signal strength to the LTE RRC in UE 410. The LTE RRC in UE 410 transfers the 5GNR signal strength to the LTE RRC in LTE eNodeB 423. The LTE RRC in LTE eNodeB 423 determines a sector power ratio, a frequency offset, and a hysteresis for 5GNR gNodeB 422. The LTE RRC in LTE eNodeB 423 determines a B1 addition threshold for 5GNR gNodeB 422 based on the sector power ratio. The LTE RRC in LTE eNodeB 423 determines an inter-RAT addition value for 5GNR gNodeB 422 based on the 5GNR signal strength, the frequency offset, and the hysteresis. The LTE RRC in LTE eNodeB 423 determines when the inter-RAT addition value is greater than the B1 addition threshold.

When the addition value is greater than the B1 addition threshold, the LTE RRC in LTE eNodeB 423 directs the 5GNR PDCP in 5GNR gNodeB 422 to serve UE 410. The LTE RRC in eNodeB 423 directs the 5GNR PDCP in UE 410 to attach to the 5GNR PDCP in 5GNR gNodeB 422 over the 5GNR RLCs, MACs, and PHYs. The 5GNR PDCP attaches to the 5GNR PDCP in 5GNR gNodeB 422 over the 5GNR RLCs, MACs, and PHYs. The 5GNR PDCP in 5GNR gNodeB 422 requests 5GNR service for UE 410 from the LTE RRC in LTE eNodeB 423 over X2 signaling. The LTE RRC in LTE eNodeB 423 requests the 5GNR service for UE 410 from MME 431 over S1-MME signaling. MME 431 directs SGW 432 to serve UE 410 over 5GNR gNodeB 422. MME 431 transfers the APNs, QCIs, and network address for UE 410 to the RRC in LTE eNodeB 423. The RRC in LTE eNodeB 423 transfers the APNs, QCIs, and network address to the 5GNR PDCP in 5GNR gNodeB 422 over X2 signaling. The 5GNR PDCP in 5GNR gNodeB 422 transfers the APNs, QCIs, and network address to the 5GNR PDCP in UE 410 over the RLCs, MACs, and PHYs. SGW 432 exchanges user data for UE 410 with external systems. SGW 432 exchanges the user data with the PDCP in 5GNR gNodeB 422. The 5GNR PDCP in 5GNR gNodeB 422 exchanges the user data with the 5GNR PDCP in UE 410 over the RLCs, MACs, and PHYs.

The RRC in LTE eNodeB 423 determines a B1 drop threshold for 5GNR gNodeB 422 based on the sector power ratio. The LTE RRC in UE 410 directs the 5GNR PHYs to measure subsequent 5GNR signal strength. The 5GNR PHYs report the 5GNR signal strength to the LTE RRC in UE 410. The LTE RRC in UE 410 transfers subsequent 5GNR signal strength to the LTE RRC in LTE eNodeB 423 over their PDCPs, RLCs, MACs, and PHYs. The LTE RRC in LTE eNodeB 423 determines an inter-RAT drop value for 5GNR gNodeB 422 based on the subsequent 5GNR signal metrics, the frequency offset, and the hysteresis. The LTE RRC in LTE eNodeB 423 determines when the inter-RAT drop is less than the B1 drop threshold. When the inter-RAT drop value is less than the B1 drop threshold, the LTE RRC in LTE eNodeB 423 directs the 5GNR PDCP in 5GNR gNodeB 422 to stop serving UE 410 and notifies MME 431. The LTE RRC in LTE eNodeB 423 directs the 5GNR PDCP in UE 410 to detach. UE 410 detaches from 5GNR gNodeB 422. MME 431 directs SGW 432 to stop serving UE 410 over 5GNR gNodeB 422. SGW 432 stops exchanging 5GNR data with the 5GNR PDCP in 5GNR gNodeB 422. The 5GNR PDCP in 5GNR gNodeB 422 stops exchanging the 5GNR data with the 5GNR PDCP in UE 410 over the RLCs, MACs, and PHYs.

The wireless data network circuitry described above comprises computer hardware and software that form special-purpose network circuitry to serve wireless UEs over 5GNR based on the sector power ratio of 5GNR wireless access nodes. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on sector power ration in 5GNR wireless access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) with a wireless communication service over multiple wireless communication links, the method comprising:

a wireless access node wirelessly receiving a signal metric for a support access node from the wireless UE;

the wireless access node determining a sector power ratio for the support access node; the wireless access node determining an add threshold for the support access node based on the sector power ratio for the support access node;

the wireless access node converting the signal metric into an add value for the support access node and determining when the add value is greater than the add threshold;

when the add value is greater than the add threshold, the wireless access node signaling the support access node to serve the wireless UE and signaling the wireless UE to attach to the support access node; and the support access node wirelessly transferring user data for the wireless communication service to the wireless UE responsive to the signaling from the wireless access node.

2. The method of claim 1 wherein the sector power ratio comprises a ratio of external sector power to internal sector power.

3. The method of claim 1 wherein the wireless access node determining the sector power ratio comprises determining an external sector power, determining an internal sector power, and determining a ratio of the external sector power to the internal sector power.

4. The method of claim 1 wherein:
the wireless access node determining a drop threshold for the support access node based on the sector power ratio for the support access node;
the wireless access node wirelessly receiving a subsequent signal metric for the support access node from the wireless UE;
the wireless access node converting the subsequent signal metric for the support access node into a drop value for the support access node and determining when the drop value is lower than the drop threshold;
when the drop value is lower than the drop threshold, the wireless access node subsequently signaling the support access node to stop serving the wireless UE and subsequently signaling the wireless UE to detach from the support access node; and
the support access node stopping the wireless transfer of the user data to the wireless UE responsive to the subsequent signaling from the wireless access node.

5. The method of claim 1 wherein:
the wireless access node determining the add threshold, determining the add value, determining when the add value is greater than the add threshold, signaling the support access node, and signaling the wireless UE comprises an LTE access node determining the add threshold, determining the add value, determining when the add value is greater than the add threshold, signaling the support access node, and signaling the wireless UE; and
the support access node wirelessly transferring the user data comprises a Fifth Generation New Radio (5GNR) access node wirelessly transferring 5GNR data.

6. The method of claim 5 wherein the LTE access node determining the add threshold, determining the add value, determining when the add value is greater than the add threshold, signaling the 5GNR access node, and signaling the wireless UE comprises the LTE access node executing a Radio Resource Control (RRC) and the RRC determining the add threshold, determining the add value, determining when the add value is greater than the add threshold, signaling the 5GNR access node, and signaling the wireless UE.

7. The method of claim 5 wherein the add threshold comprises an Evolved Universal Terrestrial Radio Access Network Dual Connectivity (EN-DC) B1 threshold.

8. The method of claim 5 wherein the signal metric for the 5GNR access node comprises Received Signal Code Power (RSCP).

9. The method of claim 5 wherein the signal metric for the 5GNR access node comprises an Energy per Chip over a Noise Spectral Density (Ec/No).

10. The method of claim 5 wherein the signal metric for the 5GNR access node comprises a Receiver Level (RxLev).

11. A wireless communication network to serve a wireless User Equipment (UE) with a wireless communication service over multiple wireless communication links, the wireless communication network comprising:
a wireless access node configured to wirelessly receive a signal metric for a support access node from the wireless UE;
the wireless access node configured to determine a sector power ratio for the support access node;
the wireless access node configured to determine an add threshold for the support access node based on the sector power ratio for the support access node;
the wireless access node configured to convert the signal metric into an add value for the support access node and determine when the add value is greater than the add threshold;
when the add value is greater than the add threshold, the wireless access node configured to signal the support access node to serve the wireless UE and signal the wireless UE to attach to the support access node; and
the support access node configured to wirelessly transfer user data for the wireless communication service to the wireless UE responsive to the signal from the wireless access node.

12. The wireless communication network of claim 11 wherein the sector power ratio comprises a ratio of external sector power to internal sector power.

13. The wireless communication network of claim 11 wherein the wireless access node configured to determine the sector power ratio further comprises the wireless access node configured to determine an external sector power, determine an internal sector power, and determine a ratio of the external sector power to the internal sector power.

14. The wireless communication network of claim 11 further comprising:
the wireless access node configured to determine a drop threshold for the support access node based on the sector power ratio for the support access node;
the wireless access node configured to wirelessly receive a subsequent signal metric for the support access node from the wireless UE;
the wireless access node configured to convert the subsequent signal metric for the support access node into a drop value for the support access node and determine when the drop value is lower than the drop threshold;
when the drop value is lower than the drop threshold, the wireless access node configured to subsequently signal the support access node to stop serving the wireless UE and subsequently signal the wireless UE to detach from the support access node; and
the support access node configured to stop the wireless transfer of the user data to the wireless UE responsive to the subsequent signal from the wireless access node.

15. The wireless communication network of claim 11 wherein:

the wireless access node configured to determine the add threshold, determine the add value, determine when the add value is greater than the add threshold, signal the support access node, and signal the wireless UE comprises an LTE access node configured to determine the add threshold, determine the add value, determine when the add value is greater than the add threshold, signal the support access node, and signal the wireless UE; and the support access node configured to wirelessly transfer the user data comprises a Fifth Generation New Radio (5GNR) access node configured to wirelessly transfer 5GNR data.

16. The wireless communication network of claim 15 wherein the LTE access node configured to determine the add threshold, determine the add value, determine when the add value is greater than the add threshold, signal the 5GNR access node, and signal the wireless UE comprises the LTE access node configured to execute a Radio Resource Control (RRC) and the RRC configured to determine the add threshold, determine the add value, determine when the add value is greater than the add threshold, signal the 5GNR access node, and signal the wireless UE.

17. The wireless communication network of claim 15 wherein the add threshold comprises an Evolved Universal Terrestrial Radio Access Network Dual Connectivity (EN-DC) B1 threshold.

18. The wireless communication network of claim 15 wherein the signal metric for the 5GNR access node comprises Received Signal Code Power (RSCP).

19. The wireless communication network of claim 15 wherein the signal metric for the 5GNR access node comprises an Energy per Chip over a Noise Spectral Density (Ec/No).

20. The wireless communication network of claim 15 wherein the signal metric for the 5GNR access node comprises a Receiver Level (RxLev).

* * * * *